United States Patent
Yokino et al.

(10) Patent No.: US 9,222,831 B2
(45) Date of Patent: Dec. 29, 2015

(54) SPECTROSCOPE

(75) Inventors: Takafumi Yokino, Hamamatsu (JP);
Katsumi Shibayama, Hamamatsu (JP);
Masaki Hirose, Hamamatsu (JP);
Katsuhiko Kato, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 4 days.

(21) Appl. No.: 14/234,663

(22) PCT Filed: May 28, 2012

(86) PCT No.: PCT/JP2012/063659
§ 371 (c)(1),
(2), (4) Date: Mar. 31, 2014

(87) PCT Pub. No.: WO2013/015008
PCT Pub. Date: Jan. 31, 2013

(65) Prior Publication Data
US 2014/0268138 A1    Sep. 18, 2014

(30) Foreign Application Priority Data

Jul. 26, 2011  (JP) ................. P2011-163638

(51) Int. Cl.
| G01J 3/28 | (2006.01) |
|---|---|
| G01J 3/02 | (2006.01) |
| G01J 3/18 | (2006.01) |
| G01J 3/24 | (2006.01) |

(52) U.S. Cl.
CPC .............. *G01J 3/0205* (2013.01); *G01J 3/0202* (2013.01); *G01J 3/0256* (2013.01); *G01J 3/0262* (2013.01); *G01J 3/0291* (2013.01); *G01J 3/1838* (2013.01); *G01J 3/24* (2013.01); *G01J 3/2803* (2013.01); *G01J 2003/1852* (2013.01)

(58) Field of Classification Search
CPC ......... G01J 3/0259; G01J 3/0205; G01J 3/02; G01J 3/0221; G01J 3/0243; G01J 3/0291
See application file for complete search history.

(56) References Cited

U.S. PATENT DOCUMENTS

2006/0285005 A1 * 12/2006 Inaba et al. ............... 348/340
2010/0208258 A1 *  8/2010 Shibayama et al. ....... 356/326

FOREIGN PATENT DOCUMENTS

| CN | 101542251 | 9/2009 |
|---|---|---|
| CN | 101970994 | 2/2011 |
| EP | 2 063 238 | 5/2009 |

(Continued)

*Primary Examiner* — Gregory J Toatley
*Assistant Examiner* — Rufus Phillips
(74) *Attorney, Agent, or Firm* — Drinker Biddle & Reath LLP

(57) ABSTRACT

A spectroscope comprises a package provided with a light entrance part, a plurality of lead pins penetrating through a support part opposing the light entrance part in the package, a light detection unit supported on the support part within the package, and a spectroscopic unit supported on the support part within the package so as to be arranged on the support part side of the light detection unit. The light detection unit has a light transmission part for transmitting therethrough light incident thereon from the light entrance part. The spectroscopic unit has a spectroscopic part for spectrally resolving the light transmitted through the light transmission part while reflecting the light to a light detection part. The lead pins are fitted into fitting parts provided with the light detection unit and electrically connected to the light detection part.

6 Claims, 12 Drawing Sheets

(56) References Cited

FOREIGN PATENT DOCUMENTS

| EP | 2 116 827 | 11/2009 |
| JP | H11-142245 A | 5/1999 |
| JP | 2000-298066 A | 10/2000 |
| JP | 2003-202463 A | 7/2003 |
| JP | 2004-354176 A | 12/2004 |
| JP | 2007-225455 A | 9/2007 |
| WO | WO-00/40935 A1 | 7/2000 |
| WO | WO 2007/060861 | 5/2007 |
| WO | WO-2008/149939 A1 | 12/2008 |

* cited by examiner

Fig.5
(a)
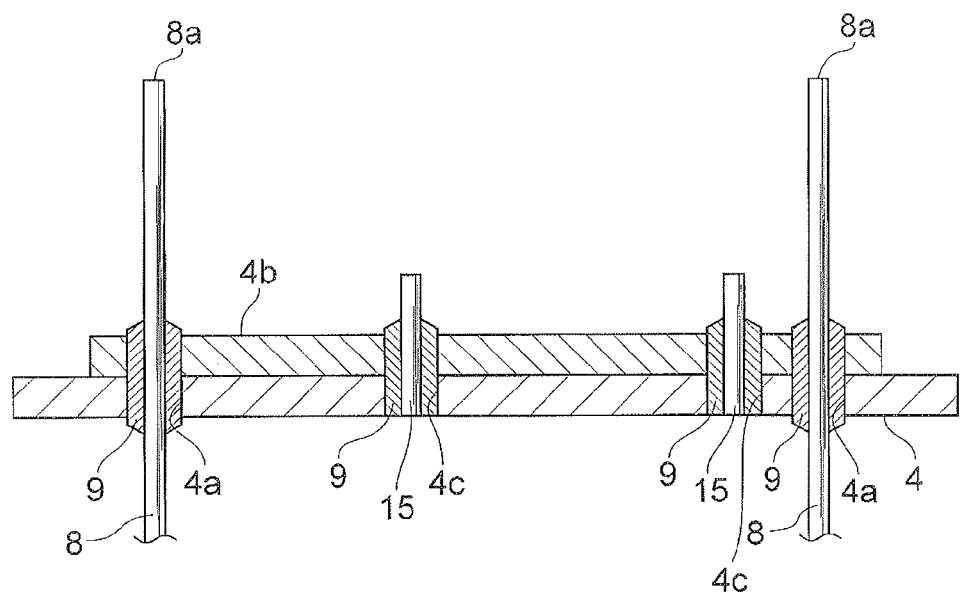
(b)
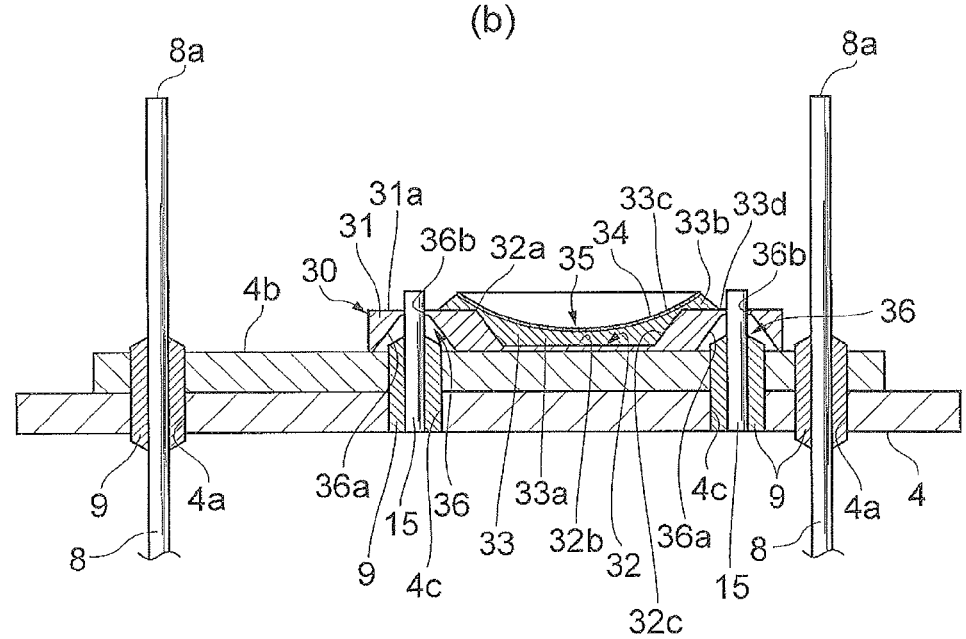

SPECTROSCOPE

TECHNICAL FIELD

The present invention relates to a spectroscope which spectrally resolves and detects light.

BACKGROUND ART

Known as a conventional spectroscope is one in which a light entrance part, a spectroscopic part, and a light detection part are secured to a wall part of a package (see, for example, Patent Literature 1). In such a spectroscope, light entering from the light entrance part is spectrally resolved and reflected by the spectroscopic part and detected by the light detection part.

CITATION LIST

Patent Literature

Patent Literature 1: Japanese Patent Application Laid-Open No. 2000-298066

SUMMARY OF INVENTION

Technical Problem

Recently, spectroscopes employed in various measurement systems and spectroscopic measurement devices have been in the process of being made smaller. For making spectroscopes smaller, it is necessary for various constituent parts to be positioned highly accurately with respect to the light entrance part provided with the package. In particular, when a light transmission part such as a slit is disposed within the package with respect to the light entrance part, it is important to position the light transmission part with respect to the light entrance part.

It is therefore an object of the present invention to provide a spectroscope in which a light transmission part disposed within a package is positioned with respect to a light entrance part furnished with the package.

Solution to Problem

The spectroscope in accordance with one aspect of the present invention comprises a package provided with a light entrance part, a plurality of lead pins penetrating through a support part opposing the light entrance part in the package, a light detection unit supported on the support part within the package, and a spectroscopic unit supported on the support part within the package so as to be arranged on the support part side of the light detection unit. The light detection unit has a light transmission part for transmitting therethrough light incident thereon from the light entrance part, while the spectroscopic unit has a spectroscopic part for spectrally resolving the light transmitted through the light transmission part while reflecting the light to a light detection part of the light detection unit. The lead pins are fitted into fitting parts provided with the light detection unit and electrically connected to the light detection part.

In this spectroscope, a plurality of lead pins penetrating through the support part opposing the light entrance part in the package are fitted into fitting parts provided with the light detection unit. As a consequence, through the plurality of lead pins, the light transmission part provided with the light detection unit is positioned with respect to the light entrance part provided with the package at least in a direction perpendicular to the direction in which the light entrance part and the support part oppose each other. Hence, this spectroscope is one in which the light transmission part disposed within the package is positioned with respect to the light entrance part provided with the package.

The spectroscopic unit of the spectroscope may be secured to the support part while in contact therewith. Alternatively, the spectroscopic unit of the spectroscope may be secured to the support part with a spacer. These structures can make the spectroscopic unit smaller and enhance the degree of freedom in designing the spectroscopic unit.

The "spectroscopic unit secured to the support part" means that the spectroscopic unit is secured to the support part either directly or indirectly (but without the light detection unit intervening in the connection between the spectroscopic unit and the support part).

The spectroscope may further comprise a light-shielding member arranged between the light detection unit and the spectroscopic unit, the light-shielding unit being provided with an opening part for transmitting therethrough the light transmitted through the light transmission part and the light spectrally resolved and reflected by the spectroscopic part. This structure can inhibit stray light from becoming incident on the light detection part.

The fitting parts of the spectroscope may be holes penetrating through the light detection unit from the spectroscopic unit side to a side opposite thereto, the lead pins being inserted into the fitting parts within the package. Alternatively, the fitting parts of the spectroscope may be depressions opening to the spectroscopic unit side, the lead pins having end parts arranged at the fitting parts within the package. These structures can easily and securely position the light transmission part with respect to the light entrance part at least in a direction perpendicular to the direction in which the light entrance part and the support part oppose each other.

Advantageous Effects of Invention

The present invention can provide a spectroscope in which a light transmission part disposed within a package is positioned with respect to a light entrance part furnished with the package.

BRIEF DESCRIPTION OF DRAWINGS

FIG. 5 is a set of sectional views for explaining a method for manufacturing the spectroscope of FIG. 1;

DESCRIPTION OF EMBODIMENTS

Figure 1:
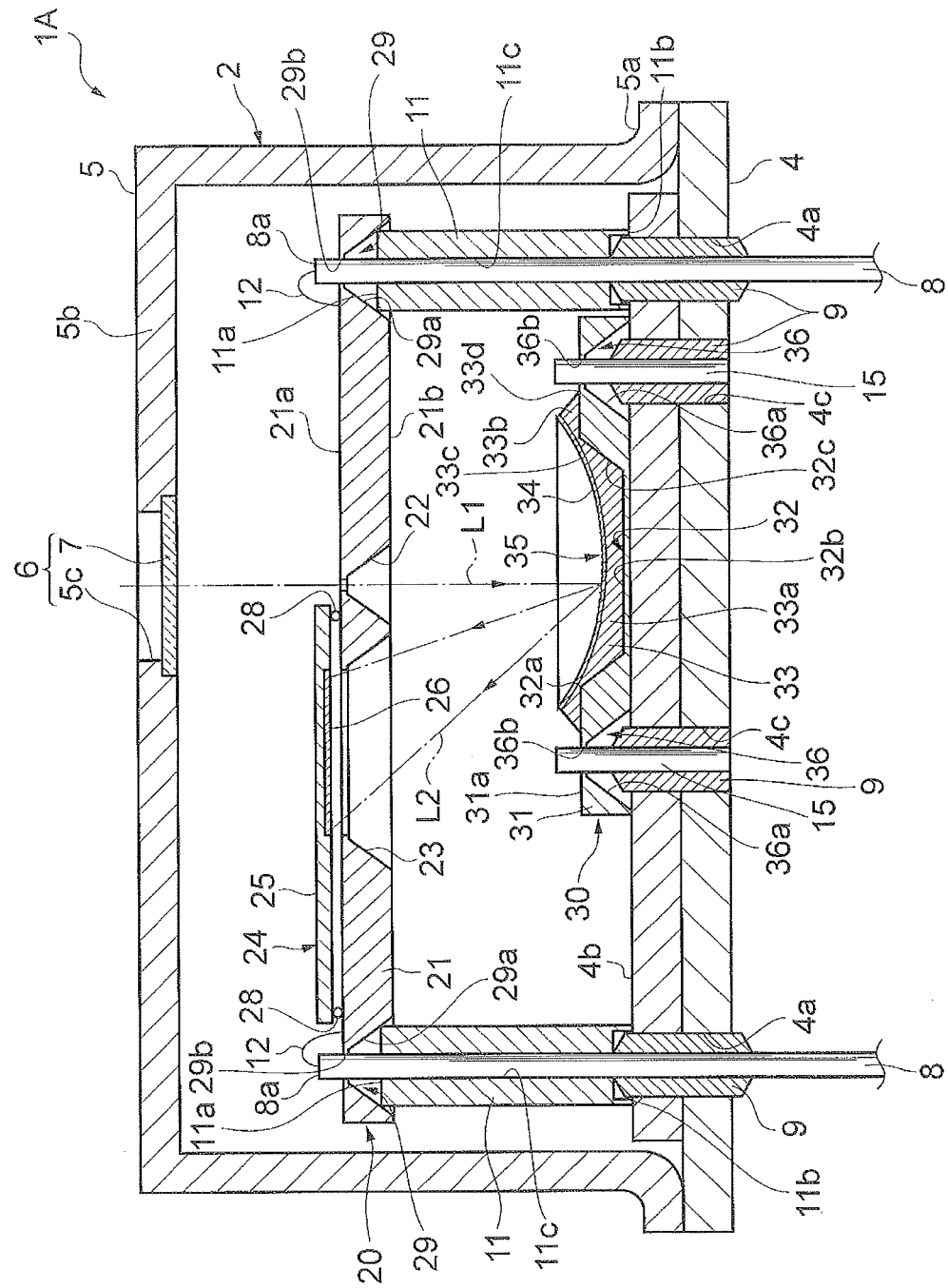
FIG. 1 is a sectional view of the spectroscope in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

Figure 2:
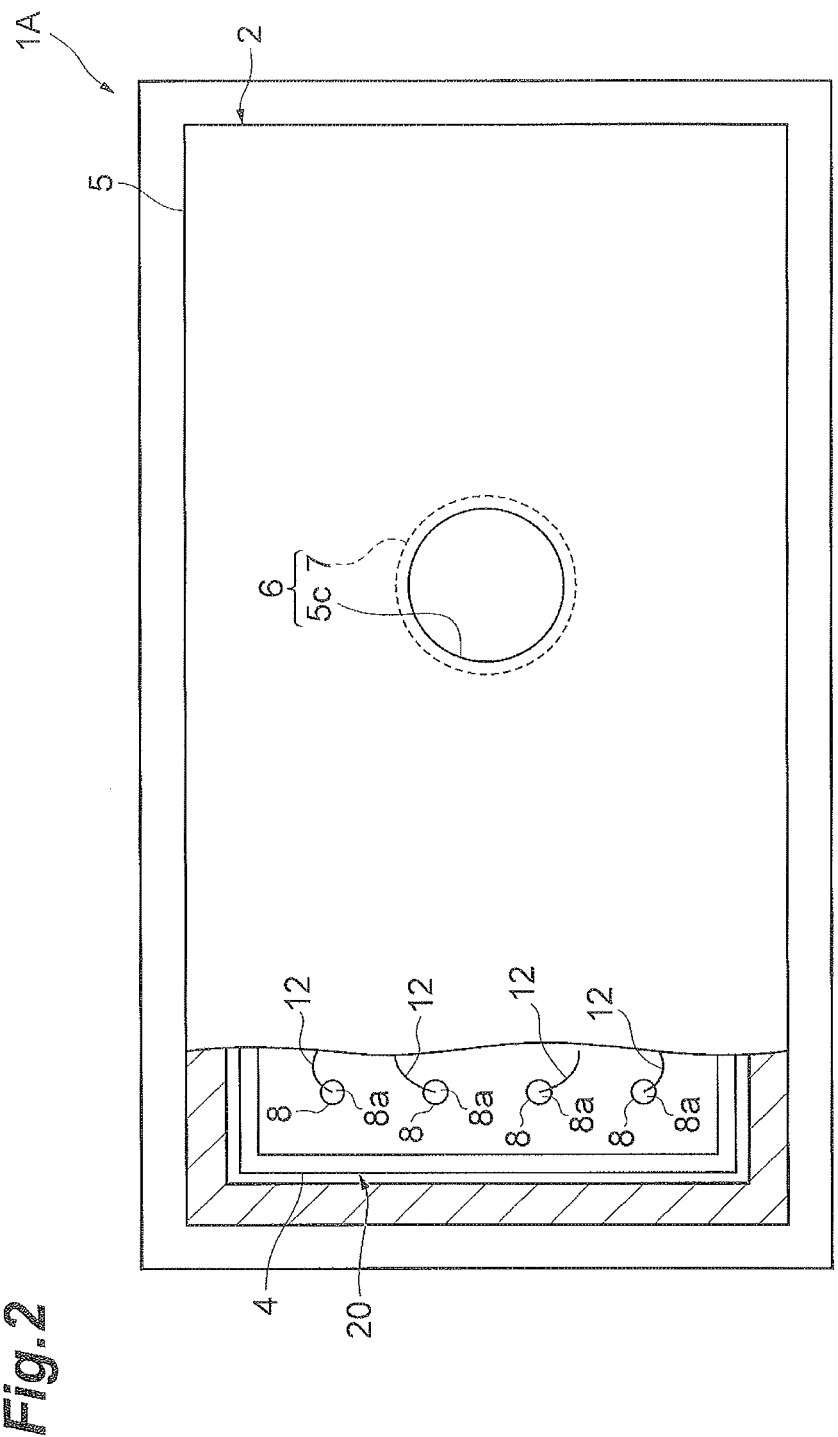
FIG. 2 is a plan view of the spectroscope of FIG. 1.

As illustrated in FIGS. 1 and 2, a spectroscope 1A comprises a package 2 constructed as a so-called CAN package, a light detection unit 20 contained in the package 2, and a spectroscopic unit 30 contained in the package 2. The spectroscope 1A spectrally resolves and detects light L1 entering the package 2 from the outside thereof. One side of the package 2 has a length of about 10 to 20 mm, for example.

The package 2 has a rectangular sheet-shaped stem (support part) 4 provided with a stepped part at a peripheral part thereof and a rectangular parallelepiped box-shaped cap 5. The stem 4 and cap 5 are made of a metal. The cap 5 has a flange 5a projecting outward from its opening end, and the flange 5a and the stepped part of the stem 4 are joined together by welding, so as to close the opening part. This makes the package 2 airtight, thereby improving the reliability of the spectroscope 1A.

A wall part 5b opposing the stem 4 in the cap 5 is provided with a light entrance part 6. That is, the stem 4 opposes the light entrance part 6. The light entrance part 6 is constituted by a light transmission hole 5c having a circular cross section formed in the wall part 5b of the cap 5 and a circular sheet-shaped window member 7 covering the light transmission hole 5c airtightly from the inside. The window member 7 is made of a material which transmits the light L1 therethrough, such as silica, borosilicate glass (BK7), Pyrex (registered trademark) glass, and Kovar, for example. The window member 7 may be provided with AR (Anti Reflection) coats, wavelength cut filters (filter resists, dielectric multilayer films, and the like) which cut unnecessary wavelengths, bandpass filters, and the like when necessary.

A plurality of lead pins 8 made of a conductive material such as copper penetrate through the stem 4. Each lead pin 8 extends in a direction (hereinafter referred to as "vertical direction") in which the light entrance part 6 and the stem 4 oppose each other and is secured to a through hole 4a of the stem 4 through a hermetic seal member 9 made of electrically insulating and light-shielding low-melting glass. Here, a plurality of through holes 4a are arranged in each of a pair of side edge parts opposing each other in the rectangular sheet-shaped stem 4.

The light detection unit 20 is supported on the stem 4 within the package 2. The spectroscopic unit 30 is supported on the stem 4 within the package 2 so as to be arranged on the stem 4 side of the light detection unit 20.

Figure 3:
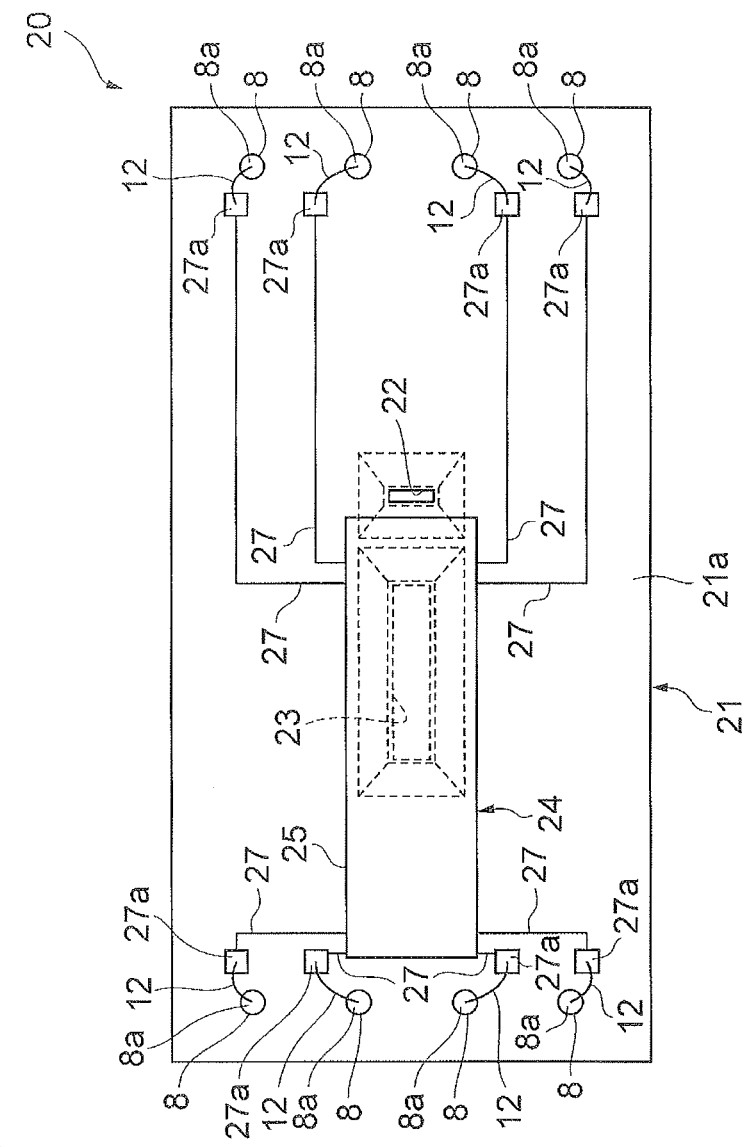
FIG. 3 is a plan view of a light detection unit in the spectroscope of FIG. 1.

As illustrated in FIGS. 1 and 3, the light detection unit 20 has a rectangular sheet-shaped substrate 21 made of a resin, ceramics, silicon, glass, or the like. The substrate 21 is formed with a slit (light transmission part) 22 extending in a predetermined direction. In the vertical direction, the slit 22 opposes the light entrance part 6 provided with the package 2 and transmits therethrough the light L1 incident thereon from the light entrance part 6. An end part on the spectroscopic unit 30 side of the slit 22 is made wider toward the spectroscopic unit 30 in both of the extending direction of the slit 22 (hereinafter referred to as "depth direction") and a direction (hereinafter referred to as "lateral direction") perpendicular to the depth and vertical directions.

A light detection device 24 is secured to a front face 21a of the substrate 21 on the side opposite to the spectroscopic unit 30. The light detection device 24 has a semiconductor substrate 25 made of a semiconductor material such as silicon and a light detection part 26 formed on a surface of the semiconductor substrate 25 on the substrate 21 side. Examples of the light detection part 26 include photodiode arrays, CMOS image sensors, and CCD image sensors. The light detection device 24 is secured to the front face 21a of the substrate 21 such that the light detection part 26 opposes a light transmission opening 23 having a rectangular cross section formed in the substrate 21. The light transmission opening 23 is formed side by side with the slit 22 in the lateral direction. An end part on the spectroscopic unit 30 side of the light transmission opening 23 is made wider toward the spectroscopic unit 30 in both of the depth and lateral directions.

A plurality of leads 27 for transmitting input/output signals and the like with respect to the light detection part 26 are disposed on the front face 21a of the substrate 21. One end part of each lead 27 is electrically connected to the light detection part 26 through a bump 28 made of Au, solder, or the like. The other end part of each lead 27 is formed into a pad part 27a. Each pad part 27a is wire-bonded to an end part 8a of its corresponding lead pin 8 by a wire 12. This electrically connects the lead pin 8 to the light detection part 26.

Figure 4:
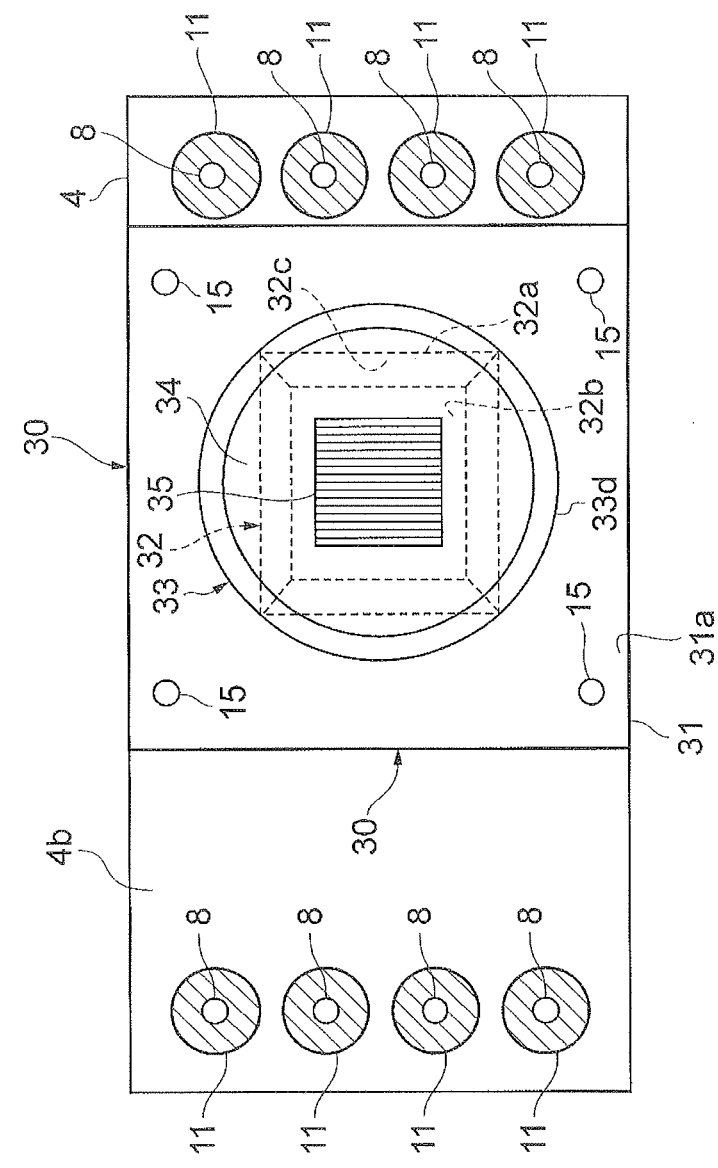
FIG. 4 is a plan view of a spectroscopic unit in the spectroscope of FIG. 1.

As illustrated in FIGS. 1 and 4, the spectroscopic unit 30 has a rectangular sheet-shaped substrate 31 made of silicon, plastics, ceramics, glass, or the like. A surface 31a on the light detection unit 20 side of the substrate 31 is formed with a depression 32 shaped like a truncated square pyramid which is made wider toward the light detection unit 20 in both of the depth and lateral directions.

On the substrate 31, a molded layer 33 is arranged so as to cover the depression 32. The molded layer 33 is formed by photocuring a replica optical resin, examples of which include photocurable epoxy resins, acrylic resins, fluorine resins, silicone, and organic/inorganic hybrid resins. The molded layer 33 is circular when seen in the depth direction of the depression 32 (i.e., from the light detection unit 20 side), while an outer rim 33d of the molded layer 33 passes all the vertices of the opening 32a of the depression 32.

The molded layer 33 has a main part 33a and overhangs 33b which are formed integrally with each other. The main part 33a is located within the depression 32 when seen in the depth direction of the depression 32 and totally covers the bottom face 32b and side faces 32c of the depression 32. The overhangs 33b are located on the surface 31a of the substrate 31 while being connected to the main part 33a and disposed on the outside of all the sides of the opening 32a of the depression 32. That is, a plurality of overhangs 33b are provided so as to oppose each other across the depression 32 and surround the depression 32.

The molded layer 33 has a concave curved surface 33c opposing the bottom face 32b that is a predetermined inner face of the depression 32. The curved surface 33c is depressed toward the center of the bottom face 32b of the depression 32 and extends from the main part 33a to the overhangs 33b through the respective midpoints of all the sides of the opening 32a of the depression 32. A predetermined area on the main part 33a in the curved surface 33c is formed with a grating pattern corresponding to a blazed grating having a saw-toothed cross section, a binary grating having a rectangular cross section, a holographic grating having a sinusoidal cross section, or the like. The grating pattern is constituted by a plurality of grating grooves, each extending in the depth direction, arranged in a row in the lateral direction.

A reflecting film 34 which is a vapor-deposited film of Al, Au, or the like is formed on the curved surface 33c of the molded layer 33. The reflecting film 34 is formed so as to correspond to the grating pattern in a predetermined region on the main part 33a in the curved surface 33c, and this portion is a spectroscopic part 35 which is a reflection grating. The spectroscopic part 35 in the spectroscopic unit 30 spectrally resolves the light L1 transmitted through the slit 22 of the light detection unit 20 and reflects thus resolved light L2 to the light detection part 26 of the light detection unit 20.

As illustrated in FIG. 1, the substrate 21 of the light detection unit 20 is formed with a plurality of holes (fitting parts) 29 penetrating therethrough from the spectroscopic unit 30 side to the side opposite thereto. A plurality of holes 29 are arranged in each of a pair of side edge parts opposing each other in the rectangular sheet-shaped substrate 21. Each hole 29 includes a truncated square pyramid part 29a becoming wider toward the spectroscopic unit 30 and a cylindrical part 29b connected to the top portion of the former part 29a.

The substrate 31 of the spectroscopic unit 30 is formed with a plurality of holes 36 penetrating therethrough from the light detection unit 20 side to the side opposite thereto. A plurality of holes 36 are arranged in each of a pair of side edge parts opposing each other in the rectangular sheet-shaped substrate 31. Each hole 36 includes a truncated square pyramid part 36a becoming wider toward the side opposite from the light detection unit 20 and a cylindrical part 36b connected to the top portion of the former part 36a.

Through a plurality of spacers 11, the optical detection unit 20 is arranged on a surface 4b of the stem 4 within the package 2. The spacers 11, each of which is formed into a circular column by a metal, plastics, ceramics, silicone, glass, or the like, are arranged between their corresponding through holes 4a of the stem 4 and their vertically opposing holes 29 of the substrate 21. One end part 11a of each spacer 11 is arranged within the part 29a of its corresponding hole 29 and secured to the substrate 21 by bonding or the like. The other end part 11b of the spacer 11 is arranged on the surface 4b of the stem 4 so as to cover its corresponding through hole 4a and secured to the stem 4 by bonding or the like. Each spacer 11 is formed with a vertical through hole 11c, which is continuous with its corresponding hole 29 and through hole 4a.

Each of the through holes 11c and holes 29 has an inner diameter sufficiently greater than the outer diameter of the lead pin 8. The lead pin 8 extending through the stein 4 within the package 2 is inserted into each set of the through hole 11c and hole 29 continuous with each other. As a consequence, the lead pins 8 are inserted and fitted into the holes 29 provided with the light detection unit 20 within the package 2. As for the contact state of the side face of the lead pin 8 with respect to the inner face of the hole 29 (the inner face of the part 29b here), the whole or a part of the side face of the lead pin 8 may be in contact with the inner face of the hole 29 or the whole of the side face of the lead pin 8 may be out of contact with the inner face of the hole 29.

The spectroscopic unit 30 is arranged on the surface 4b of the stem 4 in a region between a plurality of lead pins 8 opposing each other in the lateral direction. In this region, a plurality of positioning pins 15 are vertically disposed on the surface 4b of the stem 4 so as to correspond respectively to a plurality of holes 36 formed in the substrate 31 of the spectroscopic unit 30. The positioning pins 15 are secured to their corresponding through holes 4c of the stem 4 through the hermetic seal member 9. The spectroscopic unit 30 is secured to the surface 4b of the stem 4 by bonding or the like in a state where the positioning pins 15 are inserted into the holes 36 of the substrate 31 and in contact with the surface 4b of the stem 4.

In thus constructed spectroscope 1A, the light L1 enters the package 2 from the light entrance part 6 thereof and passes through the slit 22 of the light detection unit 20. The light L1 having passed through the slit 22 reaches the spectroscopic part 35 of the spectroscopic unit 30 and is spectrally resolved and reflected to the light detection part 26 of the light detection unit 20 by the spectroscopic part 35. The light L2 spectrally resolved and reflected by the spectroscopic part 35 passes through the light transmission opening 23 of the light detection unit 20, so as to reach the light detection part 26 of the light detection device 24, thereby being detected by the light detection device 24.

A method for manufacturing the spectroscope 1A will now be explained. First, as illustrated in FIG. 5(a), the stem 4 is prepared, and the lead pins 8 are secured to the respective through holes 4a of the stem 4, while the positioning pins 15 are secured to the respective through holes 4c of the stein 4. Subsequently, as illustrated in FIG. 5(b), the spectroscopic unit 30 is prepared, the positioning pins 15 are inserted into the respective holes 36 of the substrate 31, while the substrate 31 is brought into contact with the surface 4b of the stem 4, and the spectroscopic unit 30 is secured to the surface 4b of the stem 4 by bonding or the like in this state.

Figure 6:
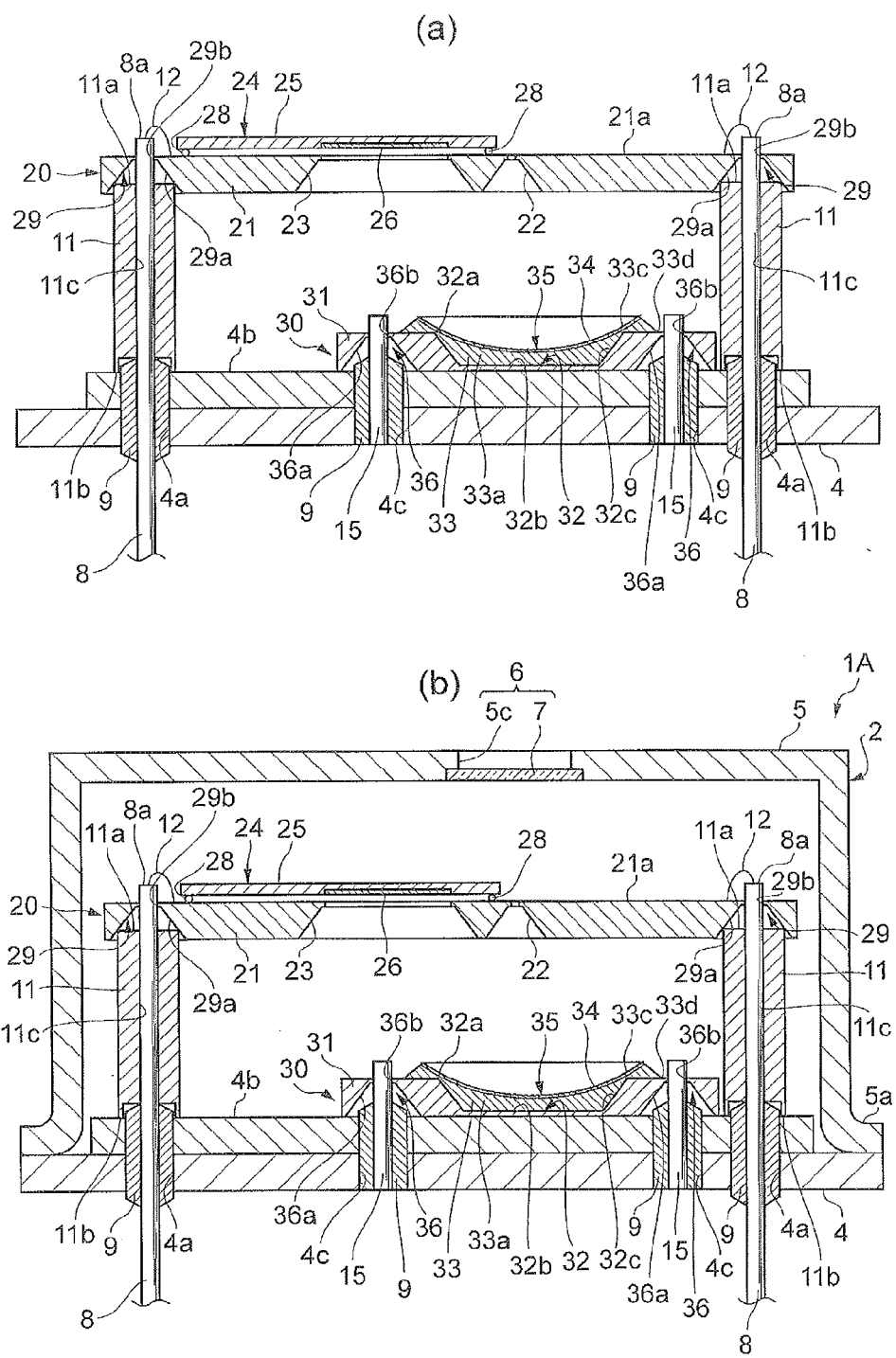
FIG. 6 is a set of sectional views for explaining the method for manufacturing the spectroscope of FIG. 1.

Next, as illustrated in FIG. 6(a), the lead pins 8 are inserted into the respective through holes 11c of the spacers 11, and the other end parts 11b of the spacers 11 are secured to the stem 4. Subsequently, the light detection unit 20 is prepared, the lead pins 8 are inserted into the respective holes 29 of the substrate 21, and the one end parts 11a of the spacers 11 are secured to the substrate 21. Then, as illustrated in FIG. 6(b), the cap 5 is arranged on the stem 4 so as to cover the light detection unit 20 and the spectroscopic unit 30, and the stepped part of the stem 4 and the flange 5a of the cap 5 are joined together by welding. The foregoing manufactures the spectroscope 1A.

In the spectroscope 1A, as explained in the foregoing, a plurality of lead pins 8 penetrating through the stem 4 opposing the light entrance part 6 in the package 2 are inserted and fitted into the holes 29 formed in the light detection unit 20. As a consequence, through the plurality of lead pins 8, the slit 22 formed in the light detection unit 20 is positioned in the lateral and depth directions with respect to the light entrance part 6 provided with the package 2. In particular, the plurality of lead pins 8 oppose each other with a predetermined distance therebetween in the lateral direction in which the slit 22 and the light detection part 26 are arranged side by side, whereby the accuracy in positioning in the lateral direction is improved in the spectroscope 1A. Hence, the spectroscope 1A is one in which the slit 22 disposed within the package 2 is positioned with respect to the light entrance part 6 provided with the package 2. Thus, in the spectroscope 1A, the lead pins 8 achieve electric connections between the light detection part 26 and the outside of the package 2 and the positioning of the slit 22 with respect to the light entrance part 6 at the same time.

Since the lead pins 8 are inserted into the through holes 11c and holes 29 continuous with each other in the spacers 11 and light detection unit 20, the spacers 11 and light detection unit 20 hold the lead pins 8, whereby the wire bonding to the end parts 8a of the lead pins 8 can be performed easily and securely.

Since the spectroscopic unit 30 is secured to the stem 4 while in contact therewith, the stem 4 can function as a heatsink, thereby inhibiting temperature from fluctuating in the spectroscopic part 35. This restrains the spectroscopic part 35 from being deformed by fluctuations in temperature, whereby spectroscopic characteristics of the spectroscopic part 35 can be stabilized. Mounting a heatsink having a large heat capacity with the stem 4 can further stabilize the spectroscopic characteristics of the spectroscopic part 35.

Employing a structure for securing the spectroscopic unit 30 to the stem 4 can make the spectroscopic unit 30 smaller with respect to the light detection unit 20 and enhance the degree of freedom in designing the spectroscopic unit 30. For example, by using the positioning pins 15, an optically functional member 38 (see FIG. 8) such as a light-shielding plate or a glass filter may be arranged on the spectroscopic part 35. After securing the substrate 31 to the stein 4, the molded layer 33 and the reflecting film 34 may be formed, so as to produce the spectroscopic part 35. When pressing a die for forming the grating pattern against the molded layer 33 in this case, the positioning pins 15 and lead pins 8 can be utilized so as to prevent the die from shifting its position in the lateral and depth directions.

When the substrate 21 or any other member (such as a light-shielding member 14 which will be explained later) having the lead pins 8 inserted therein is used, moving the cap 5 with respect to the stem 4 can position the slit 22 and light detection part 26 of the light detection unit 20 with respect to the spectroscopic part 35 of the spectroscopic unit 30 secured to the stem 4 while keeping the positional relationship between the light entrance part 6 of the cap 5 and the slit 22 of the light detection unit 20.

Figure 7:
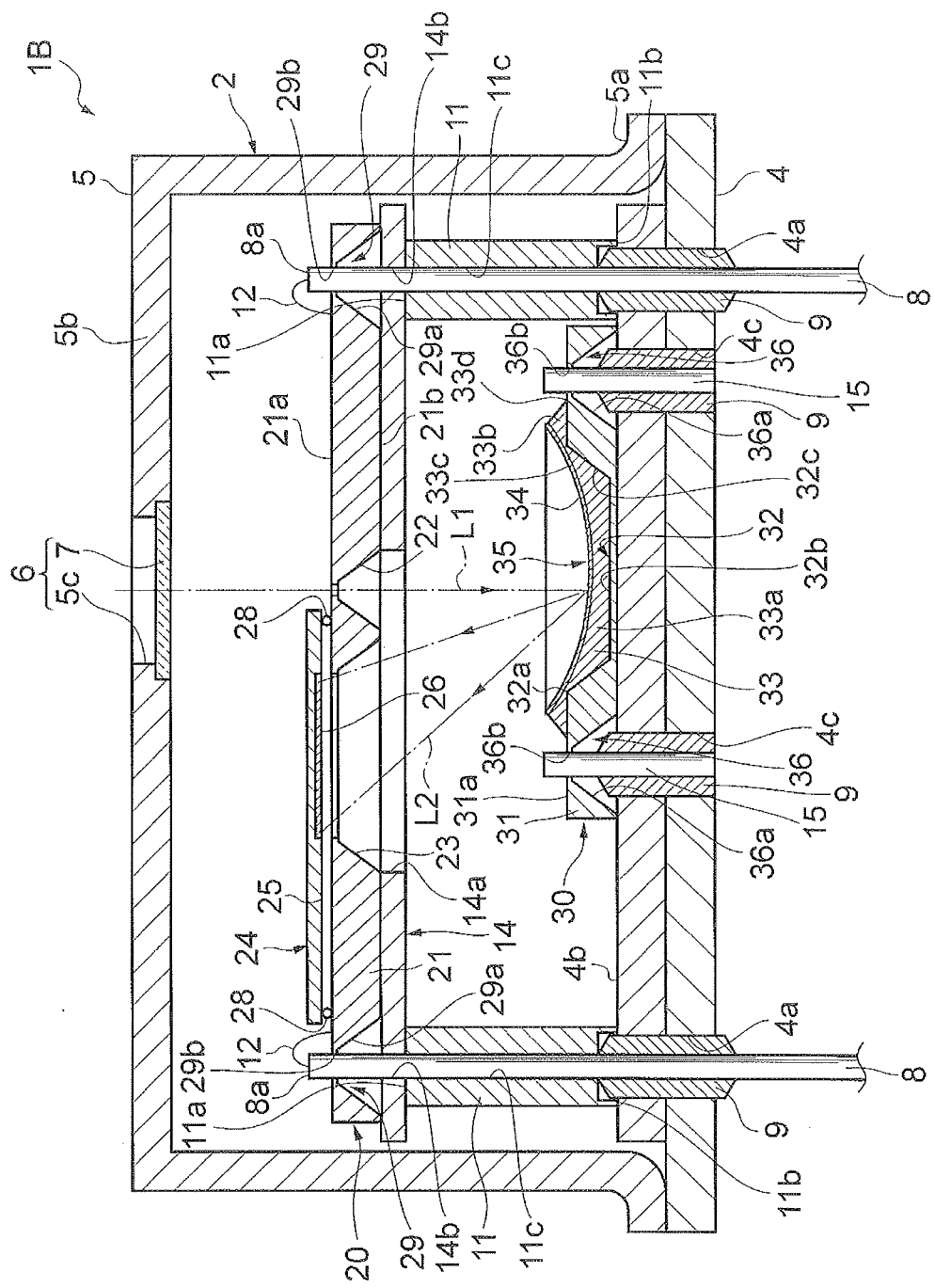
FIG. 7 is a sectional view of a modified example of the spectroscope in accordance with the first embodiment of the present invention.

A modified example of the spectroscope of the first embodiment will now be explained. As illustrated in FIG. 7, this spectroscope 1B differs from the above-mentioned spectroscope 1A mainly in that it comprises a light-shielding member 14 arranged between the light detection unit 20 and the spectroscopic unit 30.

The light-shielding member 14 is formed into a rectangular sheet by a light-shielding material and secured to the substrate 21 of the light detection unit 20 while in contact with its rear face 21b. The light-shielding member 14 is formed with a light transmission opening (opening part) 14a opposing the slit 22 and light transmission opening 23 of the substrate 21. That is, the light transmission opening 14a transmits therethrough the light L1 transmitted through the slit 22 and the light L2 spectrally resolved and reflected by the spectroscopic part 35.

The light-shielding member 14 is formed with a plurality of through holes 14b continuous with their vertically opposing holes 29 of the substrate 21 and through holes 11c of the spacers 11. That is, the lead pins 8 are also inserted in their corresponding through holes 14b of the light-shielding member 14.

In thus constructed spectroscope 1B, the light-shielding member 14 can inhibit stray light from becoming incident on the light detection part 26 provided with the light detection unit 20. The spectroscope 1B can also reduce stray light caused by multiple reflection therewithin.

The light-shielding member 14 may also be arranged at a position other than that in contact with the rear face 21b of the substrate 21 of the light detection unit 20 as long as it is located between the light detection unit 20 and the spectroscopic unit 30. A light transmission opening for transmitting the light L1 therethrough and a light transmission opening for transmitting the light L2 therethrough may be formed separately from each other in the light-shielding member 14 as long as they are opening parts for transmitting therethrough the light L1 transmitted through the slit 22 and the light L2 spectrally resolved and reflected by the spectroscopic part 35.

Figure 8:
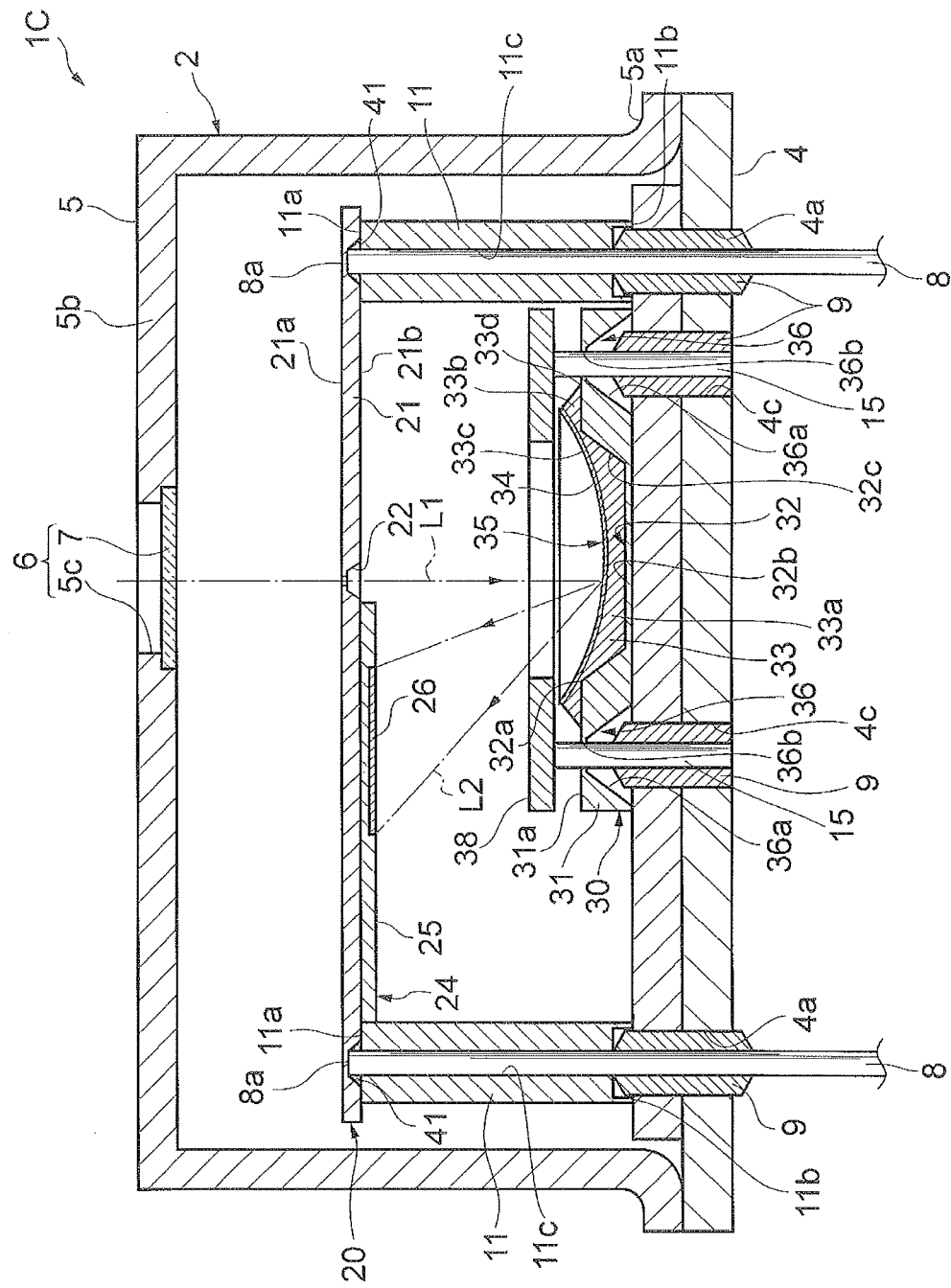
FIG. 8 is a sectional view of a modified example of the spectroscope in accordance with the first embodiment of the present invention.

Another modified example of the spectroscope of the first embodiment will now be explained. As illustrated in FIG. 8, this spectroscope 1C differs from the above-mentioned spectroscope 1A mainly in that the end parts 8a of the lead pins 8 are arranged at depressions (fitting parts) 41 formed in the light detection unit 20.

A plurality of depressions 41 are formed on the rear face 21b of the substrate 21 so as to oppose the through holes 11c of the spacers 11 in the vertical direction and open to the spectroscope unit 30 side. While the lead pins 8 are inserted in the through holes 11c of the spacers 11, their end parts 8a are arranged at and fitted into their corresponding depressions 41.

The light detection device 24 is secured to the rear face 21b of the substrate 21 while in a state where the light detection part 26 faces the spectroscopic unit 30 side. The light detection part 26 and each lead pin 8 are electrically connected to each other through a lead disposed on the rear face 21b of the substrate 21. More specifically, the leads disposed on the rear face 21b of the substrate 21 extend into the respective depressions 41 and are electrically connected to their corresponding end parts 8a of the leads 8 by a conductive adhesive or the like. The light detection part 26 is electrically connected to the leads on the rear face 21b of the substrate 21 through wires.

In thus constructed spectroscope 1C, the end part 8a of each lead pin 8 is arranged at and inserted into its corresponding depression 41. As a consequence, through a plurality of lead pins 8, the slit 22 for fined in the light detection unit 20 is positioned in the vertical direction as well as the lateral and depth directions with respect to the light entrance part 6 provided with the package 2.

Second Embodiment

Figure 9:
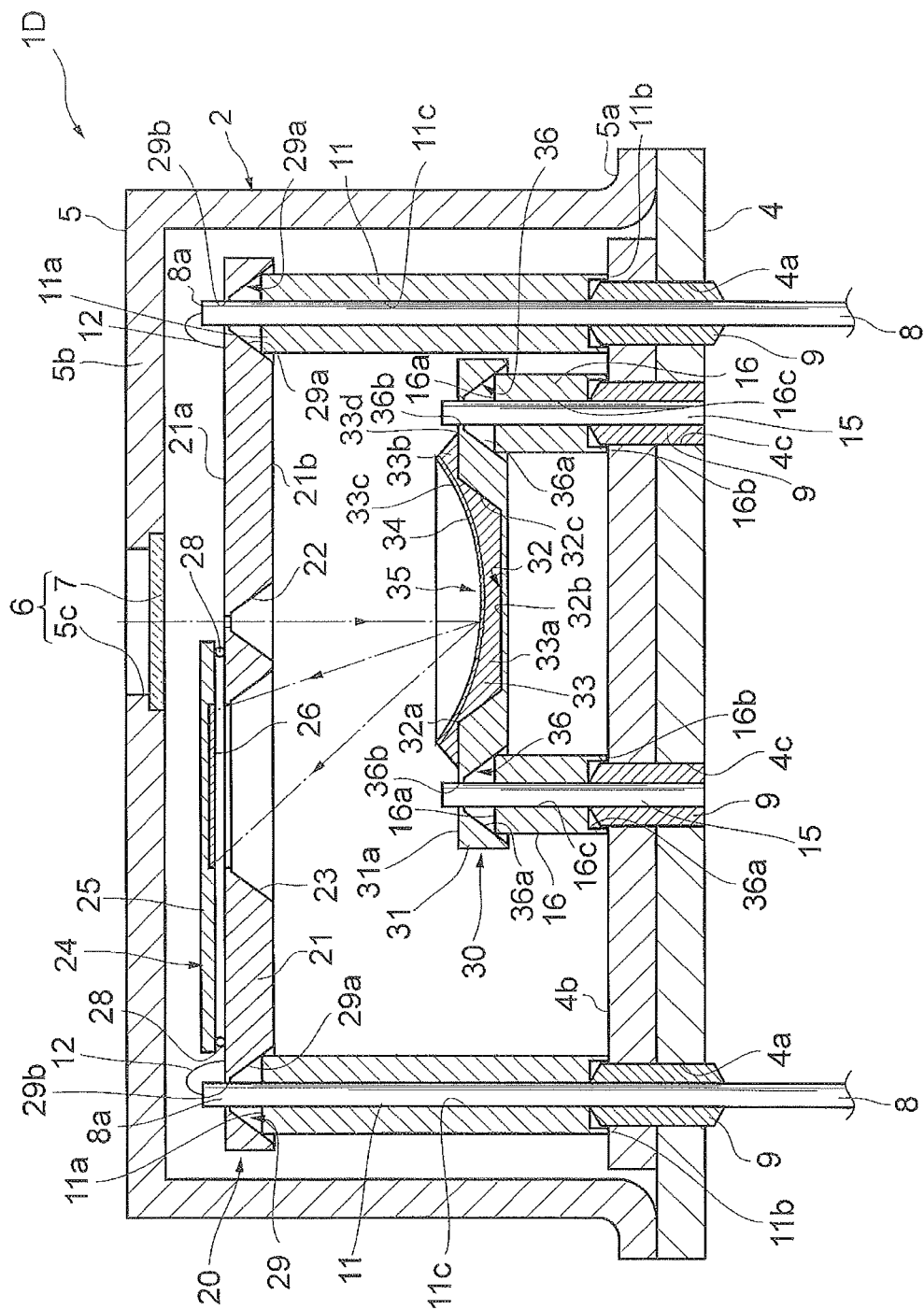
FIG. 9 is a sectional view of the spectroscope in accordance with a second embodiment of the present invention.

As illustrated in FIG. 9, a spectroscope 1D differs from the spectroscope 1A of the first embodiment mainly in that the spectroscopic unit 30 is secured to the stem 4 with spacers 16.

The spectroscopic unit 30 is arranged on the surface 4b of the stem 4 through a plurality of spacers 16 each formed into a circular column by a metal or the like. Each spacer 16 is formed with a vertical through hole 16c, into which a positioning pin 15 vertically disposed on the surface 4b of the stem 4 is inserted. In this state, one end part 16a of the spacer 16 is arranged within a part 36a of its corresponding hole 36 and secured to the substrate 31 by bonding or the like. The other end part 16b of the spacer 16 is arranged on the surface 4b of the stem 4 and secured to the stem 4 by bonding or the like.

Figure 10:
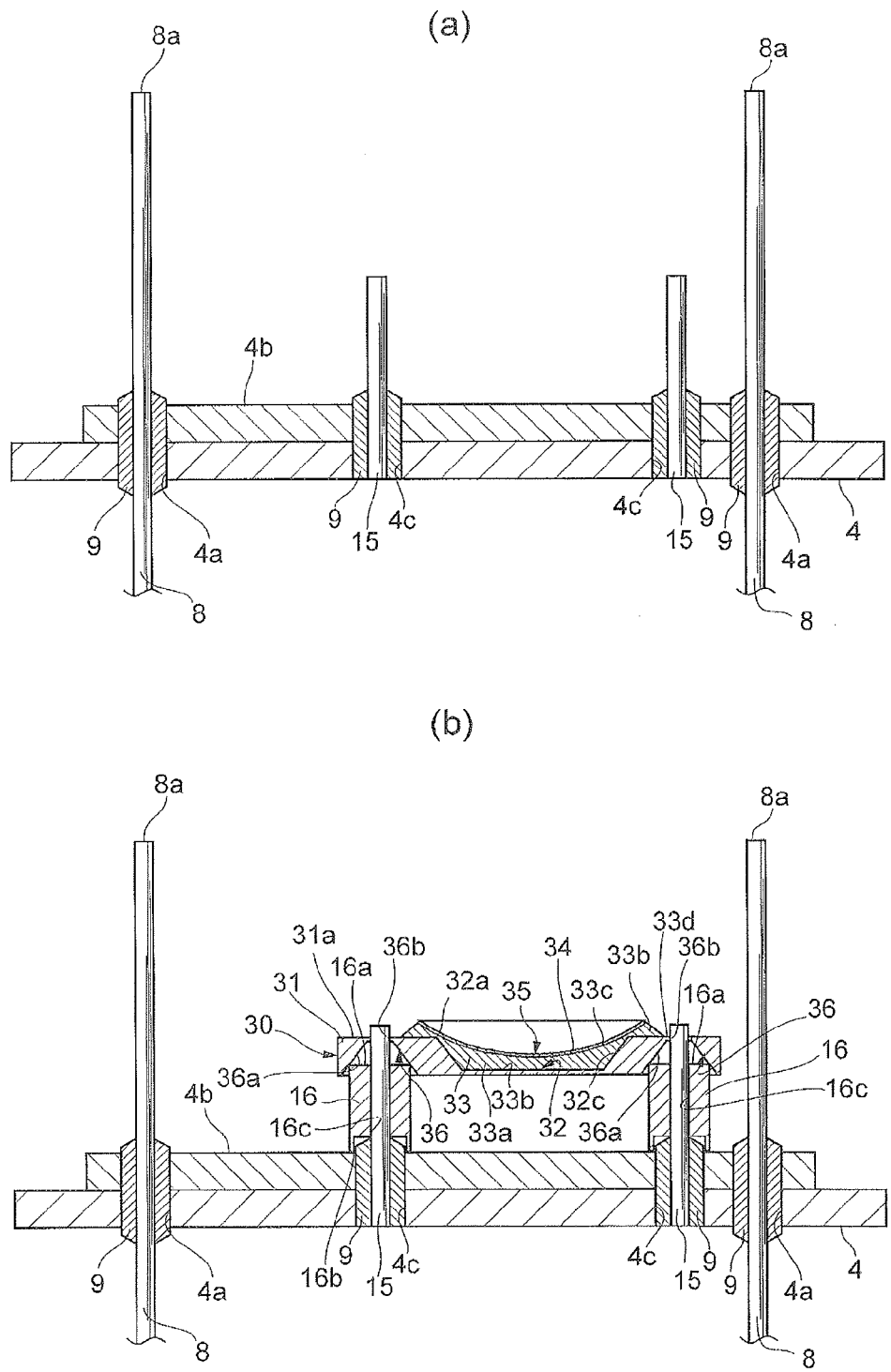
FIG. 10 is a set of sectional views for explaining a method for manufacturing the spectroscope of FIG. 9.

A method for manufacturing the spectroscope 1D will now be explained. First, as illustrated in FIG. 10(a), the stem 4 is prepared, and the lead pins 8 are secured to the respective through holes 4a of the stem 4, while the positioning pins 15 are secured to the respective through holes 4c of the stem 4. Subsequently, as illustrated in FIG. 10(b), the positioning pins 15 are inserted into the respective through holes 16c of the spacers 16, and the other end parts 16b of the spacers 16 are secured to the stem 4. Then, the spectroscopic unit 30 is prepared, the positioning pins 15 are inserted into the respective holes 36 of the substrate 31, and one end parts 16a of the spacers 16 are secured to the substrate 31.

Figure 11:
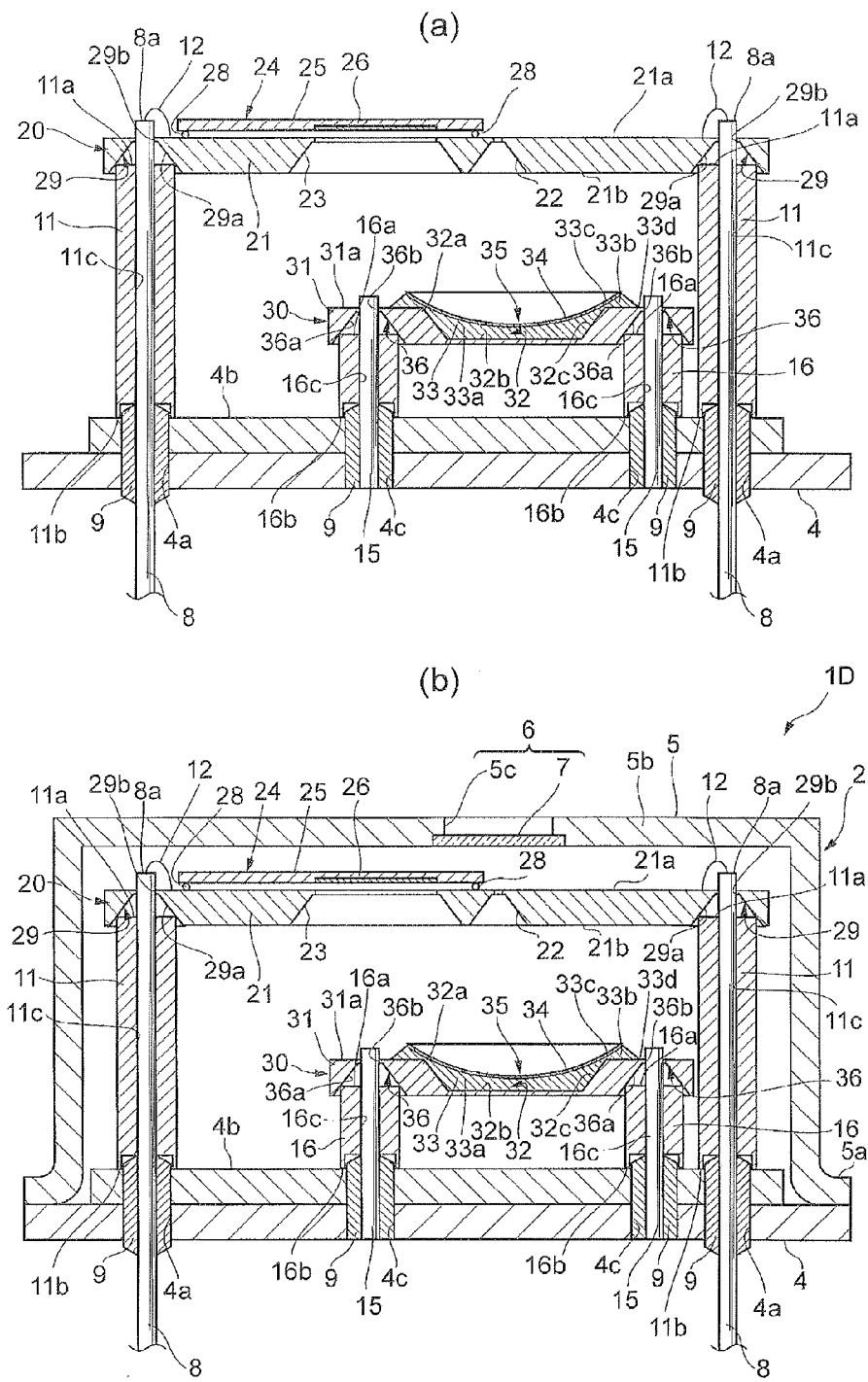
FIG. 11 is a set of sectional views for explaining the method for manufacturing the spectroscope of FIG. 9.

Next, as illustrated in FIG. 11(a), the lead pins 8 are inserted into the respective through holes 11c of the spacers 11, and the other end parts 11b of the spacers 11 are secured to the stem 4. Subsequently, the light detection unit 20 is prepared, the lead pins 8 are inserted into the respective holes 29 of the substrate 21, and the one end parts 11a of the spacers 11 are secured to the substrate 21. Then, as illustrated in FIG. 11(b), the cap 5 is arranged on the stein 4 so as to cover the light detection unit 20 and the spectroscopic unit 30, and the stepped part of the stem 4 and the flange 5a of the cap 5 are joined together by welding. The foregoing manufactures the spectroscope 1D.

In the spectroscope 1D, as explained in the foregoing, a plurality of lead pins 8 penetrating through the stem 4 opposing the light entrance part 6 in the package 2 are inserted and fitted into the holes 29 formed in the light detection unit 20. As a consequence, through the plurality of lead pins 8, the slit 22 formed in the light detection unit 20 is positioned in the lateral and depth directions with respect to the light entrance part 6 provided with the package 2. In particular, the plurality of lead pins 8 oppose each other with a predetermined distance therebetween in the lateral direction in which the slit 22 and the light detection part 26 are arranged side by side, whereby the accuracy in positioning in the lateral direction is improved in the spectroscope 1D. Hence, the spectroscope 1D is one in which the slit 22 disposed within the package 2 is positioned with respect to the light entrance part 6 provided with the package 2.

Since the lead pins 8 are inserted into the through holes 11c and holes 29 continuous with each other in the spacer 11 and light detection unit 20, the spacer 11 and light detection unit 20 hold the lead pins 8, whereby the wire bonding to the end parts 8a of the lead pins 8 can be performed easily and securely.

The spectroscopic unit 30 is secured to the stem 4 while being separated therefrom by the spacers 16. As a consequence, the spectroscopic unit 30 can be arranged accurately at a predetermined position within the package 2 regardless of the form of the surface 4b of the stem 4.

Employing a structure for securing the spectroscopic unit 30 to the stem 4 can make the spectroscopic unit 30 smaller with respect to the light detection unit 20 and enhance the degree of freedom in designing the spectroscopic unit 30. When the substrate 21 or any other member (such as the light-shielding member 14) having the lead pins 8 inserted therein is used, moving the cap 5 with respect to the stem 4 can position the slit 22 and light detection part 26 of the light detection unit 20 with respect to the spectroscopic part 35 of the spectroscopic unit 30 secured to the stem 4 while keeping the positional relationship between the light entrance part 6 of the cap 5 and the slit 22 of the light detection unit 20.

The present invention is not limited to the embodiments explained in the foregoing. For example, the fitting parts, which are provided with the light detection unit and into which the lead pins are fitted, are not limited to holes penetrating therethrough from the spectroscopic unit side to the side opposite thereto and depressions opening to the spectroscopic unit side. For example, the fitting parts may be a plurality of projections or the like formed on the rear face of the substrate of the light detection unit so as to restrain the end parts of the lead pins from moving in the lateral and depth directions. When the fitting parts are holes penetrating through the light detection unit from the spectroscopic unit side to the opposite side or depressions opening to the spectroscopic unit side, the light transmission part can be positioned easily and securely with respect to the light entrance part.

Figure 12:
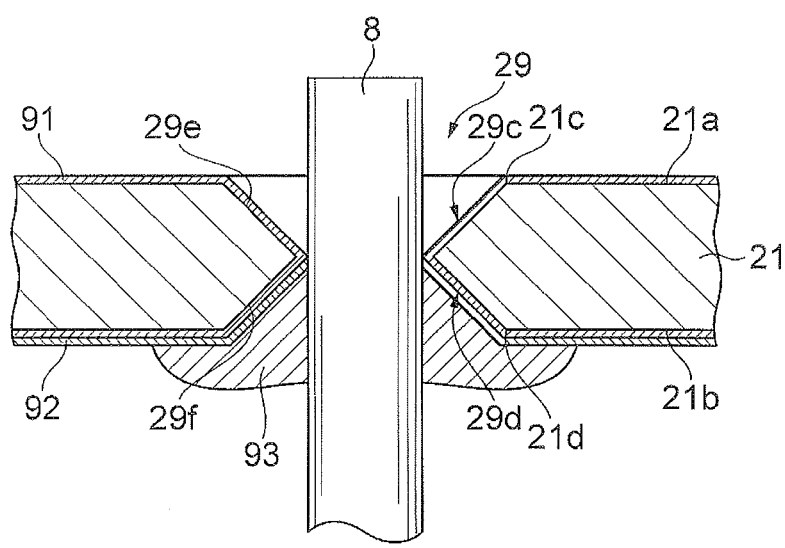
FIG. 12 is a sectional view for explaining another example of structures of fitting parts.

Another example of structures of the fitting parts will now be explained. As illustrated in FIG. 12, the substrate 21 is formed with a hole (fitting part) 29 penetrating therethrough from the rear face 21b to the front face 21a. The hole 29 includes a first part 29c opening to the front face 21a of the substrate 21 and a second part 29d opening to the rear face 21b. The first part 29c has such a form (e.g., truncated square pyramid form) as to become wider toward the front face 21a, while the second part 29d has such a form (e.g., truncated square pyramid form) as to become wider toward the rear face 21b. An insulating film 91 is formed on the front face 21a of the substrate 21, an inner face 29e of the first part 29c, the rear face 21b of the substrate 21, and an inner face 29f of the second part 29d. A metal lead 92 is formed on the part of insulating film 91 formed on the rear face 21b of the substrate 21 and the inner face 29f of the second part 29d. The lead pin 8 is inserted in the hole 29 and electrically connected to the metal lead 92 through a conductive resin 93 filling the second part 29d.

A process of forming the above-mentioned hole 29 will now be explained. First, etching masks are formed on the front face 21a and rear face 21b of the substrate 21. Subsequently, openings are formed in the etching masks by a photo work. The etching masks are made of silicon oxide ($SiO_2$), silicon nitride (SiN), or the like. Next, alkali etching is performed from the front face 21a side through the etching mask. This etching forms the first part 29c in the substrate 21. Subsequently, alkali etching is performed from the rear face 21b side through the etching mask. This etching forms the second part 29d in the substrate 21. Then, the insulating film 91 is formed on the front face 21a of the substrate 21, the inner face 29e of the first part 29c, the rear face 21b of the substrate 21, and the inner face 29f of the second part 29d. The insulating film 95 is made of an insulating material such as silicon oxide ($SiO_2$) or silicon nitride (SiN). Next, the metal lead 92 is formed by mask vapor deposition on the part of insulating film 91 formed on the rear face 21b of the substrate 21 and the inner face 29f of the second part 29d. The foregoing forms the hole 29. The lead pin 8 is inserted into the hole 29. Then, the second part 29d is filled with the conductive resin 93, whereby the lead pin 8 is electrically connected to the metal lead 92. Thus forming the fitting parts by etching the substrate 21 from both of the front face 21a and rear face 21b makes edge parts 21c, 21d of the opening have milder angles than those obtained by forming the fitting parts by through-hole etching from one side, whereby the substrate 21 can be restrained from breaking. The above-mentioned method of forming the fitting parts by etching from both sides of the substrate 21 may also be used for forming the light transmission part (slit) 22. This can inhibit the substrate 21 from breaking.

The light transmission part 22, 63 for transmitting therethrough the light L1 incident thereon from the light entrance part 6 may be one provided with the light detection unit 20, such as a slit formed in the semiconductor substrate 25 of the light detection device 24.

Various materials and forms can be employed for the constituent members of the spectroscopes 1A, 1B, 1C, 1D without being restricted to those mentioned above. When the lead pins 8 have a sufficient strength, at least the light detection unit 20, 60 may be supported by the lead pins 8 without using the spacers 11.

INDUSTRIAL APPLICABILITY

The spectroscopes 1A, 1B, 1C, 1D of the present invention can position the light transmission part 22, 63 disposed within the package 2 with respect to the light entrance part 6 provided with the package 2.

REFERENCE SIGNS LIST 1A, 1B, 1C, 1D . . . spectroscope; 2 . . . package; 4 . . . stem (support part); 6 . . . light entrance part; 8 . . . lead pin; 8a . . . end part; 11, 16 . . . spacer; 14 . . . light-shielding member; 14a . . . light transmission opening (opening part);

20 . . . light detection unit; 22 . . . slit (light transmission part); 26 . . . light detection part; 29 . . . hole (fitting part); 30 . . . spectroscopic unit; 35 . . . spectroscopic part; 41 . . . depression (fitting part)

The invention claimed is:

1. A spectroscope comprising:
a package provided with a light entrance part;
a plurality of lead pins penetrating through a support part opposing the light entrance part in the package;
a light detection unit supported on the support part within the package; and
a spectroscopic unit supported on the support part within the package so as to be arranged on the support part side of the light detection unit;
wherein the light detection unit has a light transmission part for transmitting therethrough light incident thereon from the light entrance part;
wherein the spectroscopic unit has a spectroscopic part for spectrally resolving the light transmitted through the light transmission part while reflecting the light to a light detection part of the light detection unit;
wherein the lead pins are fitted into fitting parts provided with the light detection unit and electrically connected to the light detection part;
wherein the light detection unit is provided at a distance from the spectroscopic unit so as to form a space through which the light is transmitted, the light being reflected between the light detection unit and the spectroscopic unit on the spectroscopic part and reaching the light detection unit;
wherein the spectroscopic unit is formed on a surface facing the light detection unit, a reverse side on an opposite side to the surface facing the light detection unit being secured to the support part while in contact therewith; and
through the plurality of lead pins, the light transmission part provided with the light detection unit is positioned with respect to the light entrance part provided with the package at least in a direction perpendicular to the direction in which the light entrance part and the support part oppose each other.

2. A spectroscope according to claim 1, wherein the spectroscopic unit is secured to the support part while in contact therewith.

3. A spectroscope according to claim 1, wherein the spectroscopic unit is secured to the support part with a spacer.

4. A spectroscope according to claim 1, further comprising a light-shielding member arranged between the light detection unit and the spectroscopic unit;
wherein the light-shielding unit is provided with an opening part for transmitting therethrough the light transmitted through the light transmission part and the light spectrally resolved and reflected by the spectroscopic part.

5. A spectroscope according to claim 1, wherein the fitting parts are holes penetrating therethrough from the spectroscopic unit side to a side opposite thereto; and
wherein the lead pins are inserted into the fitting parts within the package.

6. A spectroscope according to claim 1, wherein the fitting parts are depressions opening to the spectroscopic unit side; and
wherein the lead pins have end parts arranged at the fitting parts within the package.

* * * * *